US011204936B2

(12) United States Patent
Varney et al.

(10) Patent No.: US 11,204,936 B2
(45) Date of Patent: Dec. 21, 2021

(54) UTILITY METER READING TYPE CODE CONVERSION

(71) Applicant: Landis+Gyr Innovations, Inc., Alpharetta, GA (US)

(72) Inventors: Darren Varney, Maple Grove, MN (US); Todd Viegut, Coon Rapids, MN (US); Ryan Hammack, St. Louis Park, MN (US); Santosh Karki, Bloomington, MN (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 325 days.

(21) Appl. No.: 16/272,162

(22) Filed: Feb. 11, 2019

(65) Prior Publication Data

US 2020/0257696 A1 Aug. 13, 2020

(51) Int. Cl.
*G06F 16/25* (2019.01)
*G01D 4/00* (2006.01)
*H04L 29/06* (2006.01)

(52) U.S. Cl.
CPC .......... *G06F 16/258* (2019.01); *G01D 4/004* (2013.01); *H04L 69/08* (2013.01); *H04L 69/26* (2013.01)

(58) Field of Classification Search
CPC ....... G06F 16/258; G01D 4/004; H04L 69/08; H04L 69/26
See application file for complete search history.

(56) References Cited

U.S. PATENT DOCUMENTS 9,453,869 B1 * 9/2016 Parkin ................... G01R 31/50
11,010,845 B2 * 5/2021 Haynes ................. G06F 13/42

2001/0047383 A1 * 11/2001 Dutta ..................... H04L 69/329
709/201
2002/0194196 A1 * 12/2002 Weinberg ............... G06F 16/258
2003/0048199 A1 * 3/2003 Zigdon .................. H04M 15/68
340/870.02
2007/0139218 A1 * 6/2007 Bovankovich ......... G01D 4/004
340/870.02

(Continued)

OTHER PUBLICATIONS

Li Guo, 2011 International Conference on Advances in Engineering—Design of IEC-61968-based Distribution Network Information Exchange Interface, 2011, SciVerse ScienceDirect, pp. 70-77 (Year: 2011).*

*Primary Examiner* — Emily C Terrell
*Assistant Examiner* — Rufus C Point
(74) *Attorney, Agent, or Firm* — Kilpatrick Townsend & Stockton LLP (57) ABSTRACT

A system for processing reading records collected from a resource distribution network and converting IEC reading type codes is provided. For example, a meter data management system obtains meter reading records that are collected from meter nodes deployed in a resource distribution network. Each of the meter nodes is configured to measure characteristics of resource consumption at a location associated with the meter node, and each of the meter reading records includes a reading value of the resource consumption and an IEC reading type code identifying a type of the reading value. The meter data management system processes the meter reading records by converting a reading record from its original IEC reading type code to a common IEC reading type code so that the multiple meter reading records can be aggregated to generate a load profile. Loads associated with the meter nodes can be adjusted based on the generated load file.

17 Claims, 6 Drawing Sheets

(56) References Cited

U.S. PATENT DOCUMENTS

| | | | | |
|---|---|---|---|---|
| 2007/0139219 | A1* | 6/2007 | Crider | G01D 4/004 340/870.02 |
| 2009/0309756 | A1* | 12/2009 | Mason, Jr. | G01D 4/004 340/870.02 |
| 2010/0020724 | A1* | 1/2010 | Wimmer | H04L 67/2823 370/254 |
| 2011/0288905 | A1* | 11/2011 | Mrakas | G06Q 10/06 705/7.25 |
| 2011/0307932 | A1* | 12/2011 | Fan | G01D 4/004 725/110 |
| 2013/0031201 | A1* | 1/2013 | Kagan | H04L 63/029 709/213 |
| 2013/0151177 | A1* | 6/2013 | Hughes | G06Q 10/063 702/60 |
| 2013/0198245 | A1* | 8/2013 | Kagan | G01D 4/004 707/812 |
| 2013/0205022 | A1* | 8/2013 | Kagan | H04L 67/06 709/224 |
| 2015/0058974 | A1* | 2/2015 | Terashita | G06F 13/4247 726/19 |
| 2015/0125154 | A1* | 5/2015 | Chun | H04M 1/737 398/106 |
| 2016/0171066 | A1* | 6/2016 | Charlet | G06F 16/245 707/691 |
| 2017/0039184 | A1* | 2/2017 | Song | G01C 21/203 |
| 2017/0039372 | A1* | 2/2017 | Koval | G01R 22/06 |
| 2017/0149586 | A1* | 5/2017 | Takahashi | H04L 12/4625 |
| 2017/0220404 | A1* | 8/2017 | Polar Seminario | G06F 11/0736 |
| 2018/0309682 | A1* | 10/2018 | Larumbe | H04L 41/147 |
| 2019/0213163 | A1* | 7/2019 | Haynes | H04L 69/22 |

\* cited by examiner

UTILITY METER READING TYPE CODE CONVERSION

TECHNICAL FIELD

This disclosure relates generally to processing measurement data recorded in a resource distribution network. More particularly, this disclosure relates to processing reading type codes in the measurement data, such as those specified in part 9 of the International Electrotechnical Commission ("IEC") 61968 standard.

BACKGROUND

In a resource distribution network, such as a water distribution network, an electric grid, or a gas distribution network, meters installed at endpoints of the distribution network are typically configured to measure various characteristics associated with the distribution network, such as the power consumption at an endpoint within a certain period of time, a peak voltage of the electricity measured at the endpoint, and so on. Due to the large volume of the meters in the network and the wide variety of data that the meters are configured to measure, representing and managing the meter measurement data can be challenging.

In order to provide a unified format for the meter measurement data, part 9 of the IEC 61968 standard defines reading type codes that specify enumerations of a set of message types that can be utilized to define the measurement data. Given a meter measurement data and its associated reading type code, the type and nature of the measurement data, such as the unit, the measurement period, the accumulation mode of the measurement data can be determined. Analyzing the measurement data, however, is a non-trivial task because measurement data having different reading type codes represent data with different nature, and these data cannot be combined or otherwise aggregated directly. The IEC 61968 standard itself also does not provide any mechanism for processing the meter measurement data based on their respective reading type codes.

SUMMARY

Aspects and examples are disclosed for apparatuses and process for processing meter reading records and converting IEC reading type codes of the meter reading records. For instance, a method for managing a resource distribution network includes receiving an input identifying a geographical area of the resource distribution network at a meter data management system. The meter data management system further obtains meter reading records that are collected from meter nodes deployed in the geographical area of the resource distribution network. Each of the meter nodes is configured to measure at least one characteristic of resource consumption at a location associated with the meter node, and each of the meter reading records includes a first reading value of the at least one characteristic of resource consumption and a first IEC reading type code identifying a type of the first reading value. The meter data management system processes the meter reading records by converting at least one of the meter reading records from the first IEC reading type code to a common IEC reading type code so that reading values of the meter reading records can be aggregated to generate a load profile. Loads associated with the meter nodes can be adjusted based on the load profile.

In another example, a system for managing a resource distribution network includes meter nodes deployed in the resource distribution network and a computing device configured for obtaining meter reading records collected from the meter nodes. Each of the meter reading records includes a first reading value and a first IEC reading type code identifying a type associated with the first reading value. The computing device processes the plurality of meter reading records by converting at least one of the meter reading records from the first IEC reading type code to a common IEC reading type code so that reading values of the plurality of meter reading records can be aggregated to generate operational parameters of the resource distribution network. The resource distribution network can be adjusted based on the generated operational parameters.

In an additional example, a non-transitory computer-readable medium having program code executable by processing devices for performing operations for processing meter reading code is provided. The operations include obtaining meter reading records collected from one or more meter nodes deployed in the resource distribution network. Each of the plurality of meter reading records includes a first reading value and a first IEC reading type code identifying a type associated with the first reading value. The operations further include processing the meter reading records by converting at least one of the meter reading records from the first IEC reading type code to a common IEC reading type code so that reading values of the plurality of meter reading records can be aggregated to generate operational parameters of the resource distribution network. The resource distribution network can be adjusted based on the generated operational parameters.

These illustrative aspects and features are mentioned not to limit or define the presently described subject matter, but to provide examples to aid understanding of the concepts described in this application. Other aspects, advantages, and features of the presently described subject matter will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Systems and methods are provided for converting reading type codes associated with meter reading data. For example, meter reading records generated at meters in a resource distribution network can be transmitted to a headend system of the resource distribution network, for example via a mesh network associated with the resource distribution network. The headend system or other systems, collectively called "meter data management system" can aggregate and analyze the meter reading records for various purposes, such as resource network management. The meter data management system can also receive an input that specifies various parameters or preferences for the data analysis, including a geographical area in which the meter reading records are to be analyzed, an output format of the analysis results, and other preferences.

Based on the input, the meter data management system analyzes the meter reading records to determine if a conversion of reading records, including the reading type code, is needed. If so, the meter data management system determines if the conversion is a valid conversion and determines steps for the conversion based on configuration data. The converted reading records can then be utilized to perform various analysis related to the resource distribution network, such as load management, network maintenance, billing generation, cogeneration management, and so on.

Techniques described in the present disclosure may increase the efficiency of analyzing the meter reading records by providing centralized meter reading record conversion. Any updates to the meter reading records, such as the reading type code definition or enumeration, can be performed at the meter data management system without changing other portions of the system. Compared with a distributed conversion mechanism, the centralized meter measuring data conversion eliminates network communication among different portions of the system and also eliminates inconsistency in data processed in different portions of the system. In addition, the conversion technologies presented herein is flexible and configurable. Any updates to the conversion process can be performed by updating the configuration data utilized for the conversion. This increases the speed of the overall conversion process and also the accuracy of the conversion because the conversion configuration data can be updated whenever needed and utilized in the conversion process immediately.

Figure 1:
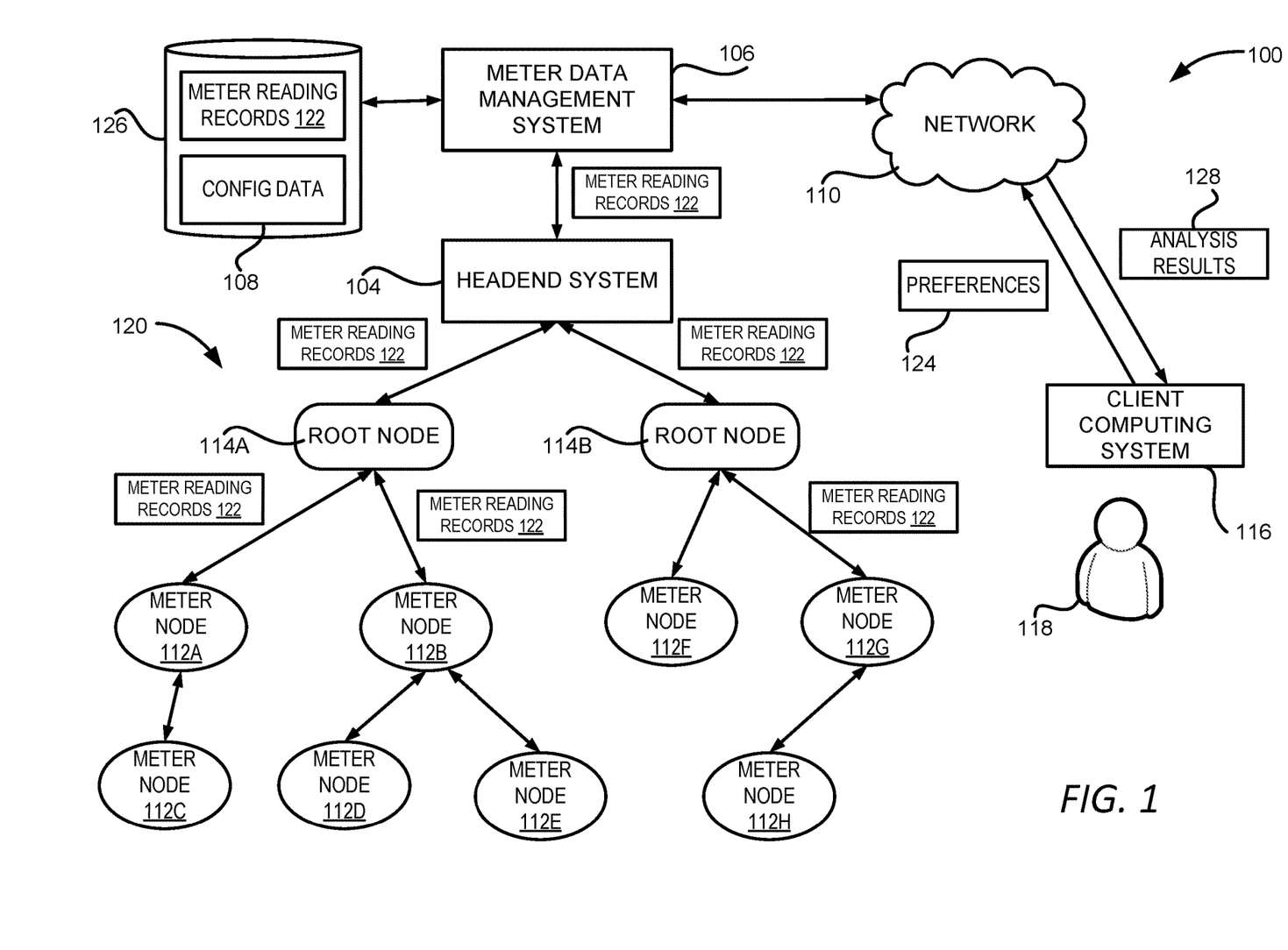
FIG. 1 is a block diagram showing an illustrative operating environment for collecting and converting reading type codes associated with meter reading data of a resource distribution network, according to certain examples of the disclosure.

FIG. 1 shows an illustrative operating environment 100 for collecting and converting reading type codes associated with meter reading data of a resource distribution network. The environment 100 includes a mesh network 120 associated with the resource distribution network for delivering measurement data obtained by meter nodes in the resource distribution network. The mesh network 120 includes multiple meter nodes 112A-112H (which may be referred to herein individually as a meter node 112 or collectively as the meter nodes 112). The meter nodes 112 can be any type of meters in a utility network, such as electricity meters, gas meters, water meters, steam meters, etc. The meter nodes 112 can be implemented to measure various operating characteristics of the resource distribution network, such as characteristics of resource consumption. For example, in a power distribution network, meter nodes 112 can monitor and measure characteristics related to power usage in the network. Example characteristics related to power usage in the resource distribution network include average or total power consumption, power surges, power outages, and load changes. The meter nodes 112 can be configured to represent the measurement data using the reading type code according to the IEC 61968 standard. In one example, the measurement data can include meter reading records 122, also referred to as reading records 122, and each of the meter reading records 122 can include a reading value and a reading type code identifying metadata for the reading value that describes the nature or type of the reading value. Additional details of the reading records 122 are described below with respect to FIGS. 2A and 2B.

The meter nodes 112 transmit the collected data, including the reading records 122, through the mesh network 120 to root nodes 114A and 114B (which may be referred to herein individually as a root node 114 or collectively as the root nodes 114). In addition to collecting data from other meter nodes 112, the root nodes 114 can also measure and monitor operating characteristics of the resource distribution network and generate corresponding meter reading records 122. The root nodes 114 ultimately transmit the generated and collected meter reading records 122 to the headend system 104 via one or more additional networks. The headend system 104 can function as a central processing system that receives streams of meter reading records 122 from the root node 114. The headend system 104 can then forward the collected meter reading records 122 to a meter data management system 106 for processing and conversion. Alternatively, or additionally, the reading records 122 can be stored in a datastore 126 and the meter data management system 106 can access the datastore 126 to retrieve the reading records 122 for processing.

It should be understood that while FIG. 1 illustrates the headend system 104 and the meter data management system 106 as separate systems, these two systems can be implemented as one system and can execute on one computing device. For example, the headend system 104 can be configured to implement the meter data management system 106 for processing the reading records 122 as described herein. In addition, reading type code conversion described herein can also be implemented in a system other than the meter data management system 106, or implemented as a standalone service.

As shown in FIG. 1, the operating environment 100 can also include a client computing system 116 connected to the meter data management system 106, for example, through a network 110. The network 110 might be a local-area network ("LAN"), a wide-area network ("WAN"), the Internet, or any type of data communications network known in the art that enables communications between the client computing system 116 and the meter data management system 106. The client computing system 116 may be a personal computer ("PC"), a desktop workstation, a laptop, a smartphone, a server computer, or any other computing device capable of connecting to the network 110 and communicating with the meter data management system 106.

A user 118, such as an administrator of a utility maintaining the resource distribution network, can utilize the client computing system 116 to specify preferences 124 of analyzing or processing the collected reading records 122. For example, the meter data management system 106 can present or cause a user interface to be presented to the user 118 on the client computing system 116, such as through a web browser or a dedicated application executing on the client computing system 116. Through the user interface, the user 118 may specify a specific geographic area in the preferences 124 and instruct that the reading records 122 collected within that specific geographic area are to be processed and analyzed. The user 118 may also specify, in the preferences 124, a time period for the analysis, i.e. reading records 122 containing measurement within the specified time period are to be analyzed. In addition, the preferences 124 can further include the type of analysis to be performed using the reading records 122, such as processing the reading records 122 to determine a total power consumption, an average power consumption, a peak consumption time period, and so on. The user 118 can further specify in the preferences 124 the output format of the analysis results. For instance, the user 118 can specify average power consumption expressed in terms of megawatts (MW) for a 60-minute time interval.

Based on the preferences 124 received from the client computing system 116, the meter data management system 106 can identify or otherwise obtain the reading records 122 satisfying the preferences 124, such as the geographical area requirement and time period requirement. The meter data management system 106 can further determine if the conversion of the reading records 122 is needed in order to perform the analysis as specified in the preferences 124. Continuing with the above example, if the preferences 124 indicate the average power consumption to be expressed in terms of megawatts (MW) in a 60-minute time interval, reading records 122 that contain reading values measured in a different time interval, such as a 15-minute interval, need to be converted to the 60-minute time interval before being aggregated with other reading records 122 to calculate the average consumption. Similarly, reading records 122 whose reading values are expressed in a scale other than megawatts need to be converted to megawatts before the calculation. It should be understood that the above example of meter data analysis is a highly simplified example merely for illustrative purposes, and should not be construed as limiting.

To facilitate the conversion process, the meter data management system 106 can access the datastore 126 for configuration data 108. The configuration data 108 can include data that can be utilized to perform the conversion of one reading type code to another reading type code of a reading record 122. For example, the configuration data 108 can include one or more valid conversion tables utilized to determine whether the conversion from a source reading type code to a destination reading type code is valid. The configuration data 108 may also include data utilized to perform the conversion, such as a unit table with associated conversion parameters, a conversion table from one enumeration to another enumeration of a field of the reading type code, and so on. Additional details regarding the configuration data 108 and the conversion of the reading type code are described below with regard to FIGS. 2-5.

According to some aspects of the disclosure presented herein, the user 118 can also upload meter reading records 122 to the meter data management system 106 for processing. The uploaded reading records 122 can include historical reading records 122 collected from the mesh network 120 but was no longer stored by the headend system 104 or the meter data management system 106. The uploaded reading records 122 can also include measurement data from a resource distribution network different from the resource distribution network associated with the mesh network 120. In the latter scenario, the meter data management system 106 can function as a data analysis and conversion service for external resource distribution networks.

In either case, the meter data management system 106 can generate analysis results 128 based on the converted reading records 122 and transmit the analysis results 128 back to the user 118 or can transmit the analysis results 128 to another user or system so that further actions can be taken based on the results. In one example, the analysis results 128 can include a load profile of the resource distribution network, and the load profile can be utilized to balance the load of the resource distribution network. In another example, the analysis results 128 can include abnormality of the resource distribution network, such as the unexpected high voltage in a certain area of the network, and the resource distribution network can be adjusted accordingly to eliminate the abnormality. Other types of analysis results 128 can be generated and utilized to modify, improve or otherwise change the resource distribution network.

It should be understood that while the above description focuses on transmitting the reading records 122 from the meter nodes 112 to the headend system 104 through a mesh network 120, other types of transmission network can also be utilized in place of, or concurrently with, the mesh network 120. For example, the reading records 122 can be transmitted from the meter nodes 112 to the headend system 104 through a cellular network, or a power line communication ("PLC") network. It should be further understood that while the above example describes that a user 118 requests the analysis of the reading records 122, the processing and conversion functionality described herein can be invoked by other automated processing routines, which may or may not be directly or indirectly instructed by a user 118. For example, a validation routine that monitors energy consumption and flags any spikes for an audit or exception report may access the functionality described herein to perform data normalization before executing its validation routines.

Figure 2A:
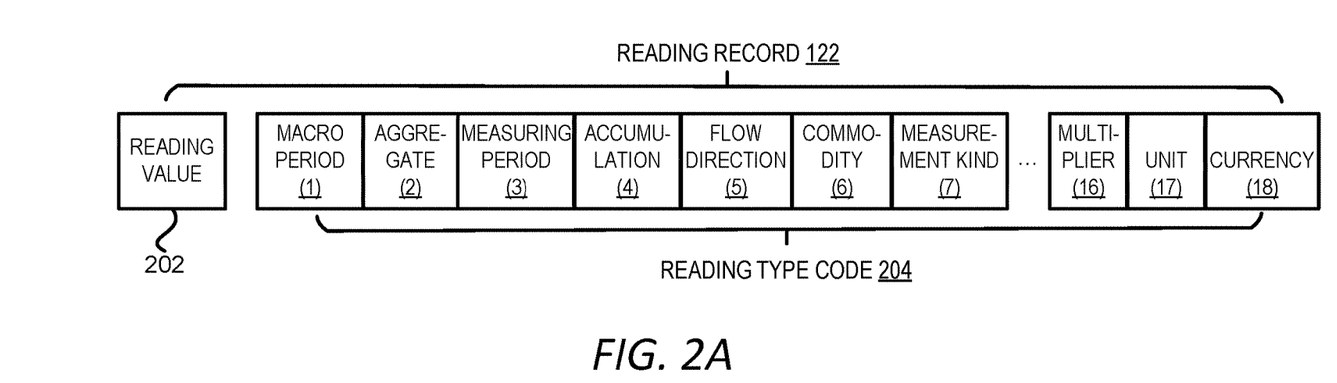
FIG. 2A is an illustration of a reading record that includes a reading value and a reading type code, according to certain examples of the disclosure.

FIG. 2A illustrates a reading record 122 obtained by the meter data management system 106 for analysis and conversion. As shown in FIG. 2A, the reading record 122 includes a reading value 202 and a reading type code 204. The reading value 202 reflects the value measured by a corresponding meter node 112. The reading type code 204 identifies the metadata for the reading value 202 that describes the nature or the type of the reading value 202. In this example, the reading type code 204 follows the $2^{nd}$ Edition of Part 9 of the IEC 61968 standard. The IEC 61968 standard defines a reading type code containing 18 fields describing different aspects of the reading value 202. The reading type code 204 shown in FIG. 2A illustrates a subset of the 18 fields of a reading type code.

As shown in FIG. 2A, field 1 of the reading type code 204 specifies the macro period of the measurement associated with the reading value 202, such as daily, monthly, seasonally, or following the billing period. Field 2 of the reading type code 204 specifies the aggregation type associated with the reading value 202, such as average, minimum, maximum or summation. Field 3 specifies the measuring period corresponding to the reading value 202, such as a 5-, 15-, 30-, or 60-minute period, or a 24-hour period. Field 4 specifies the accumulation mode indicated by the reading value 202, such as a bulk quantity, a summation, or a delta data (i.e. consumption) of the resource consumed at the location associated with the meter node 112. Field 5 specifies the flow direction of the measured resource, such as a forward flow, a reverse flow, a leading flow, a lagging flow or a total flow. Field 6 specifies the type of commodity being measured, such as primary electricity, secondary electricity, portable water, natural gas, heading fluid, or cooling fluid. Field 7 specifies the kind of quantity measured by the meter node 112, such as energy, power, current, voltage, or demand.

The reading type code 204 also includes field 16 specifying a multiplier (also referred to as a scale indicator) of the reading value 202. For example, if the multiplier is 2, the actual value corresponding to a reading value of 25.4 is $25.4 \times 10^2 = 2540$. The reading type code 204 further includes a unit at field 17 indicating the unit of the reading values. For example, if the measurement is performed for electricity resource, the unit for the reading value 202 can include watts (W), watts-hour (Wh), ampere (A), ampere-hour (Ah), volt (V), and so on. Field 18 of the reading type code 204 indicates a currency associated with the reading value 202. For each of the 18 fields, the IEC 61968 standard provides a list of enumerations of the possible values and the respective codes. A reading type code can be generated by selecting the code for the corresponding enumeration for each field.

As can be seen from FIG. 2A, if two reading records 122 have two different reading type codes 204, it can mean that the reading values 202 of the two reading records 122 differ in terms of unit, scale, measuring period, or other aspects. As such, the two reading values 202 cannot be combined or operated upon directly. In order to perform analysis using the reading values of the reading records 122, at least some of the reading records 122 need to be converted from their respective source reading type codes 204 to a destination reading type code 204, such as a common reading type code 204 shared by all the reading records 122 to be aggregated or otherwise processed.

Figure 2B:
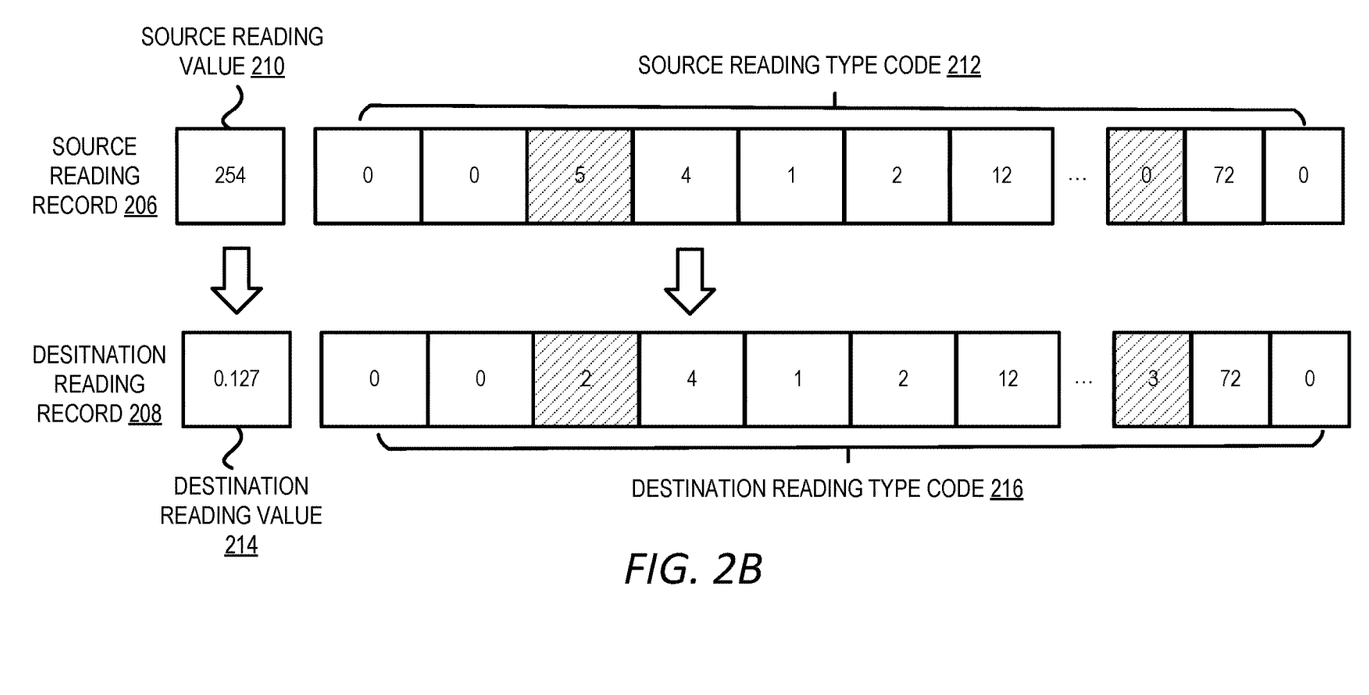
FIG. 2B illustrates an example of a source reading record and an example of a destination reading record, according to certain examples of the disclosure.

FIG. 2B illustrates an example of a source reading record 206 and an example of a destination reading record 208. In FIG. 2B, the source reading record 206 includes a source reading value of 254 and a source reading type code "0.0.5.4.1.2.12.0.0.0.0.0.0.0.0.0.72.0" indicating that the reading record is for primary electricity consumed within a 30-minute measuring period, and the unit of the reading value 254 is watts-hour (Wh) and the scale is 0. Based on the preferences 124, the meter data management system 106 might determine that the output format of the analysis requires the power consumption to be measured in a 15-minute window and expressed in term of kilowatts hour. As a result, the meter data management system 106 can determine that the source reading record 206 needs to be converted to a destination reading record 208 having a destination reading type code 216 satisfying the output format requirement. As shown in FIG. 2B, the destination reading type code 216 has two fields different from the source reading type code 212: the measuring period and the multiplier. The measuring period field is changed from "5" indicating a 30-minutes measuring period as in the source reading type code 212 to "2" indicating a 15-minutes measuring period. The multiplier field is changed from "0" indicating no multiplier to "3" indicating a scale of 1000. The reading value of the source reading record 206 is also changed accordingly from 254 to a destination reading value of 0.127. After the conversion, the destination reading record 208 can be aggregated with other reading records 122 to perform analysis as specified in the preferences 124.

Figure 3A:
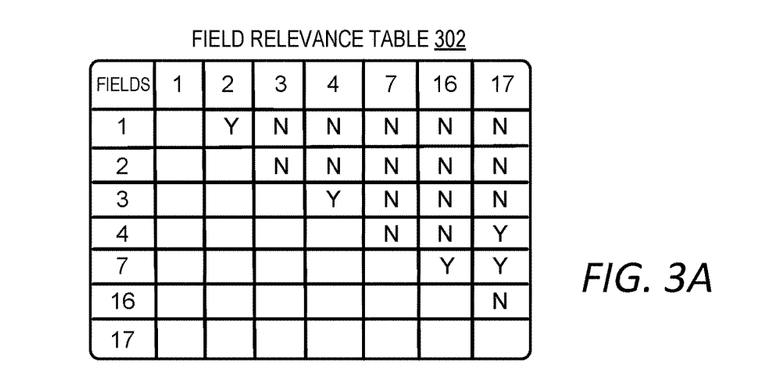
FIG. 3A illustrates an example of a field relevance table contained in the configuration data utilized for converting reading type codes, according to certain examples of the disclosure.

As discussed briefly above, the meter data management system 106 can perform the conversion of the reading type code based on configuration data 108. FIGS. 3A-3D show several examples of configuration data 108 that can be utilized to facilitate the conversion. FIG. 3A is an example of a field relevance table 302 that can be utilized to evaluate the validity of a source reading type code 212 and a destination reading type code 216. The field relevance table 302 in FIG. 3A shows a portion of a complete field relevance table providing the relevance between all the pairs among 18 fields of the reading type code in the $2^{nd}$ Edition of the Part 9 of the IEC 61968 standard. The example of the field relevance table 302 indicates that field 1 (i.e. macro period) is related to filed 2 (i.e. aggregate type), but is not related to other fields. Similarly, field 3 (i.e. measuring period) is related to field 4 (i.e. accumulation mode), but not other fields in the field relevance table 302.

Figure 3B:
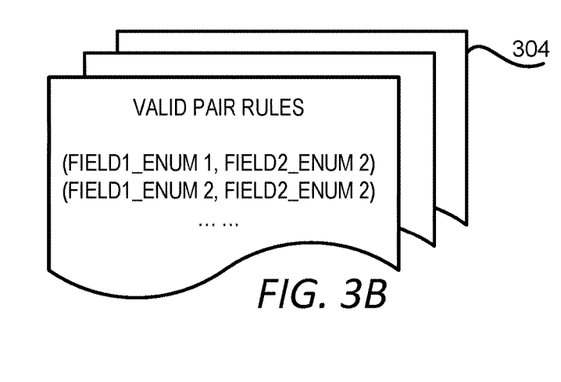
FIG. 3B illustrates examples of valid pair rules contained in the configuration data utilized for converting reading type codes, according to certain examples of the disclosure.

If two fields of the reading type code 204 are related, it can mean that the value or the enumeration of one field needs to be compatible with the value or the enumeration of the other field. For example, the field relevance table 302 indicates that field 7 (i.e. the measurement kind) is related to field 17 (i.e. the unit of the measurement). In other words, the unit of the measurement needs to be compatible with the measurement kind. A unit enumeration of "kWh" would be compatible with a measurement kind enumeration of "energy," but not compatible with a measurement kind enumeration of "voltage." The compatibility between the enumerations of relevant fields can be included in valid pair rules 304 as shown in FIG. 3B. As shown in FIG. 3B, the valid pair rules 304 can include a list of valid pairs of enumerations between two relevant fields. If a pair of enumerations between two relevant fields is not listed in the valid pair rules 304, the pair of enumerations can be determined to be invalid and thus the reading type code 204 containing the invalid pair of enumerations is also invalid.

Figures 3C, 3D:
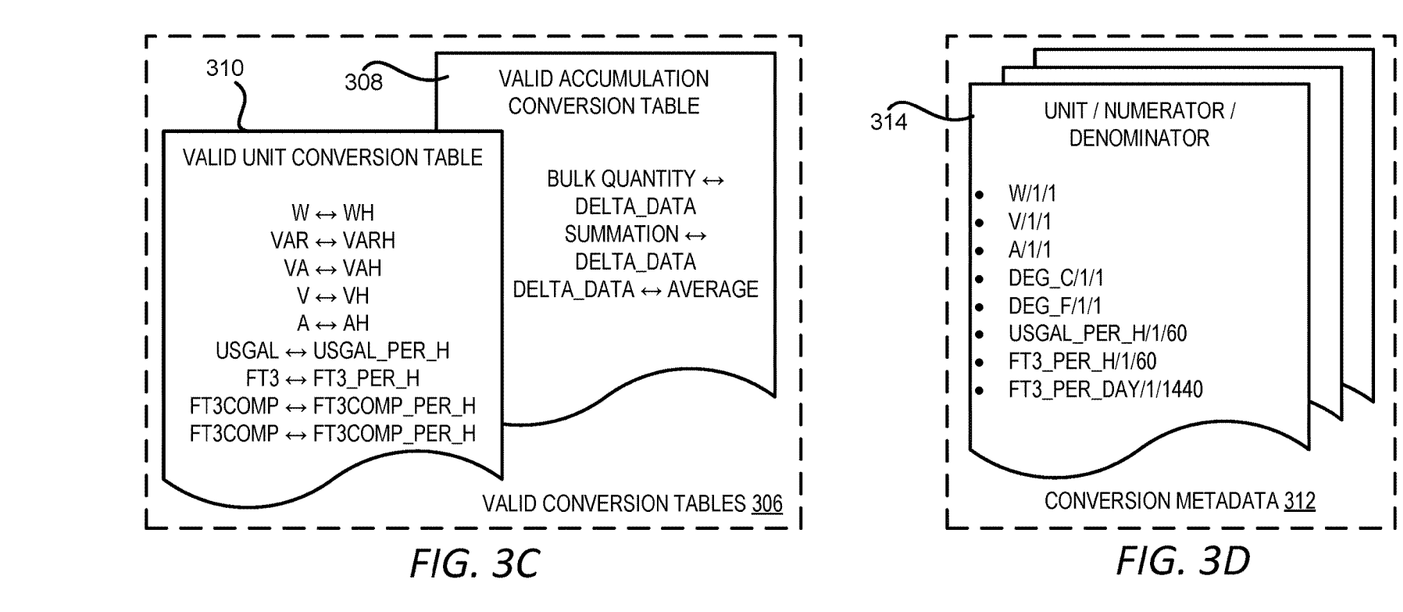
FIG. 3C illustrates examples of valid conversion tables contained in the configuration data utilized for converting reading type codes, according to certain examples of the disclosure.
FIG. 3D is an example of conversion metadata contained in the configuration data utilized for converting reading type codes, according to certain examples of the disclosure.

FIG. 3C shows examples of valid conversion tables contained in the configuration data 108 that can be utilized to determine whether the conversion from a source reading type code 204 to a destination reading type code 204 is valid. For example, FIG. 3C shows that the valid conversion tables 306 can include a valid unit conversion table 310. The valid unit conversion table 310 contains valid conversions from one enumeration to another enumeration of the unit field. For example, the valid unit conversion table 310 indicates that a conversion from watts (W) to watts hour (Wh) is a valid conversion. Similarly, the valid conversion tables 306 can include a valid accumulation conversion table 308 listing the valid conversions from one accumulation enumeration to another accumulation enumeration. Conversions that are not listed in the valid conversion tables 306 can be determined to be an invalid conversion, such as a conversion from watts (W) to volt hour (Vh) in the unit field.

FIG. 3D shows an example of conversion metadata 312 contained in the configuration data 108. The conversion metadata 312 can include any metadata that can be utilized during the conversion from a source reading type code 204 to a destination reading type code 204. For example, the conversion metadata 312 can include a unit/numerator/ denominator table 314 listing all the unit enumerations and their respective numerator and denominator utilized when converting the reading type code 204 and associated reading value 202. Consider the following example:

$$DeltaData = Average \times (Average.unit.numerator/Average.unit.denominator) \times (DeltaData.unit.denominator/DeltaData.unit.numerator) \times DeltaData.measuringPeriod.intervalLength \times 10^{(Average.multiplier - DeltaData.multiplier)}.$$

In this example, the conversion involves changing the enumeration of field 4 (i.e. accumulation mode) from "average" to "delta data." Such a conversion would require the meter data management system 106 to know the enumeration of the field 17 (i.e. unit) associated with the source enumeration "average" and the destination enumeration "delta data" as well as their associated numerator and denominator so that the conversion of the reading value 202 can be performed on the right scale. The unit/numerator/denominator table 314 contained in the conversion metadata 312 can provide such information to the meter data management system 106. The conversion metadata 312 can also include other metadata that are useful for the meter data management system 106 to perform the conversion.

Although, in the above description with respect to FIGS. 3A-3D, the various data contained in the configuration data 108 are described as tables, rules, or lists, it will be appreciated by one skilled in the art that each of the data structures shown in the figures may represent a database table, an object stored in a computer memory, a programmatic structure, or any other data container commonly known in the art. Each data element included in the data structures may represent one or more fields or columns of a database table, one or more attributes of an object, one or more member variables of a programmatic structure, or any other unit of data of a data structure commonly known in the art. The implementation is a matter of choice and may depend on the technology, performance, and other requirements of the computing system upon which the data structures are implemented.

By utilizing the configuration data 108, updates to the meter data management system 106 can be performed efficiently by updating the configuration data 108 without impacting the rest of the system. For example, an update to the IEC 61968 standard can be performed by updating the corresponding data contained in the configuration data 108. For instance, if the standard is updated to add a new enumeration for a specific field, this change can be incorporated in the configuration data 108 by adding items that are related to the added enumeration, such as valid pair rules, valid conversion tables, or other conversion metadata. No changes need to be made to the rest of the meter data management system 106, thereby eliminating the downtime of the system associated with the update, and reducing computational resource consumption caused by the updates.

Figure 4:
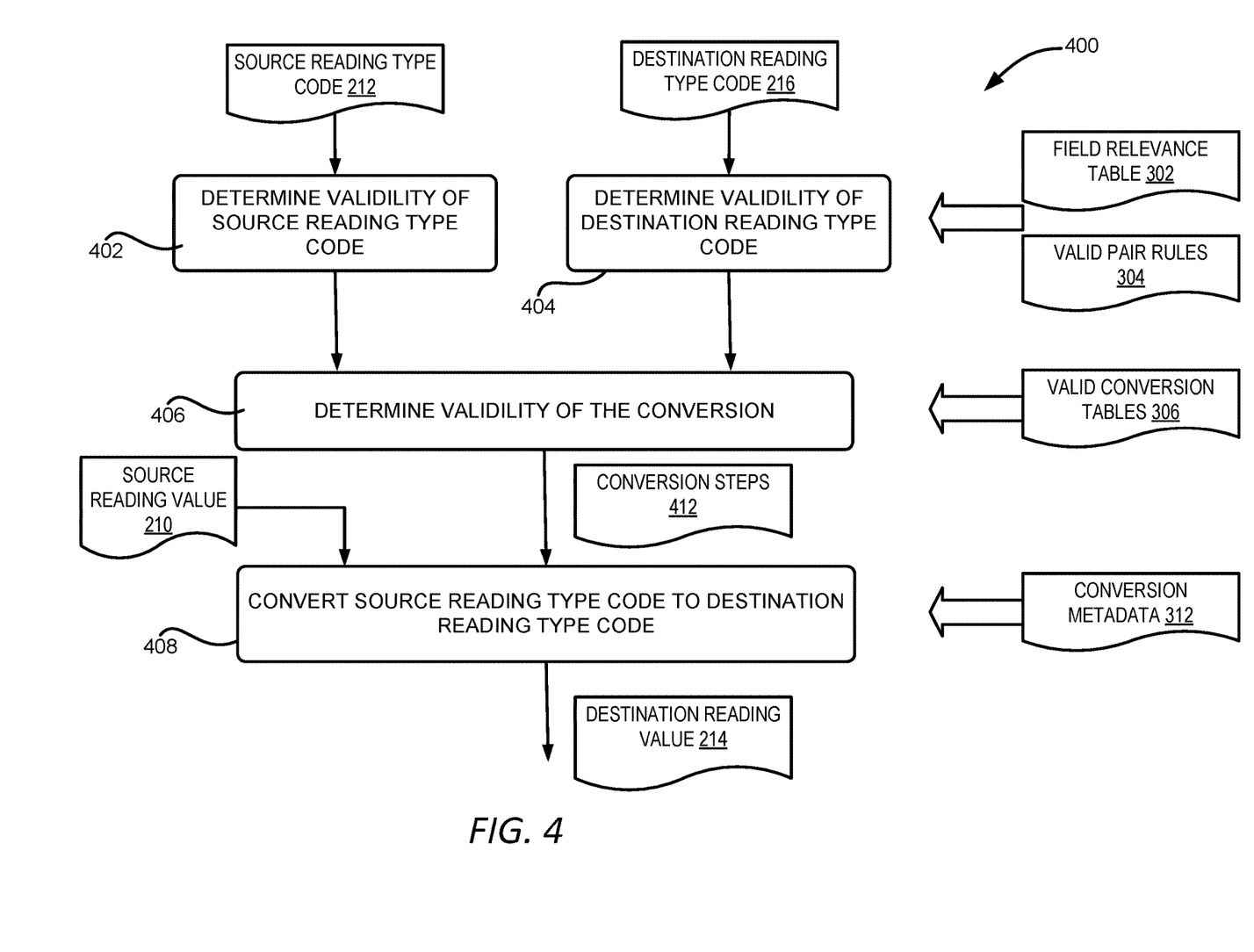
FIG. 4 is an example of a process for converting a source reading type code to a destination reading type code, according to certain examples of the disclosure.

FIG. 4 is an example of a process 400 for converting a source reading type code 212 to a destination reading type code 216 based on configuration data 108. One or more computing devices (e.g., the meter data management system 106 or the headend system 104) implement operations depicted in FIG. 4 by executing suitable program code. For illustrative purposes, process 400 is described with reference to certain examples depicted in the figures. Other implementations, however, are possible.

At blocks 402 and 404, process 400 involves determining the validity of the source reading type code 212 and the validity of the destination reading type code 216, respectively. The meter data management system 106 can obtain the destination reading type code 216 from the preferences 124 specified by the user 118. Alternatively, or additionally, the meter data management system 106 can determine the destination reading type code 216 based on the requirements of the analysis. In other words, the meter data management system 106 can determine the destination reading type code 216 so that multiple reading records 122 can share a common reading type code 204 in order to perform analysis, such as aggregating the reading records 122, calculating statistics of the reading records 122, and so on.

At block 402, the meter data management system 106 can determine the validity of the source reading type code 212 based on the configuration data 108, including the field relevance table 302 and the valid pair rules 304. The meter data management system 106 can examine the fields of the source reading type code 212 pair by pair and determine using the field relevance table 302 whether a pair of fields is relevant. For those pairs of fields that are relevant, the meter data management system 106 can further examine the enumerations contained in the source reading type code 212 for validity.

According to some aspects of the disclosure presented herein, the meter data management system 106 can determine that the enumerations for a pair of relevant fields are a valid pair if there is a match in the valid pair rules 304. If the enumerations for all the pairs of relevant fields find a match in the valid pair rules 304, the meter data management system 106 can determine that the source reading type code 212 is a valid reading type code; otherwise, the meter data management system 106 can determine that the source reading type code 212 is invalid. It should be understood that the mechanism described above for determining the validity of the source reading type code 212 is for illustration purposes and should not be construed as limiting. Various other methods can be utilized to determine whether the source reading type code is valid or not. The meter data management system 106 can determine the validity of the destination reading type code 404 in the same way as described above with respect to block 402.

If the source reading type code 212 or the destination reading type code 216 is determined to be invalid, an error message can be sent to the client computing system 116 so that the user 118 or other individuals can take proper actions to identify the source of the invalid reading type codes. In some scenarios, an invalid source reading type code might indicate one or more malfunctioning components in the system, such as the meter node 112 generating the source reading type code 212, the root node 114 receiving and forwarding the source reading type code 212, or the headend system 104 collecting the reading records 122. An invalid source reading type code 212 might further indicate an abnormality in the network for transmitting the reading records 122, such as the mesh network 120, the cellular network or the PLC network.

Identifying invalid reading type codes can also help to filter out reading records 122 that the meter data management system 106 cannot process. As discussed above, the meter data management system 106 may receive reading records 122 uploaded by the user 118 through the client computing system 116. These reading records 122 might be generated by meter nodes from a resource network with a different configuration and/or generated using a different format. Identifying invalid source reading type codes before the conversion can help to identify the incompatible reading records 122 early on, thereby avoiding computational resource consumption caused by incompatible reading records 122.

After determining that the source reading type code 212 and the destination reading type code 216 are valid, the meter data management system 106 can determine, at block 406, whether the conversion from the source reading type code 212 to the destination reading type code 216 is valid or not. Determining the validity of the conversion can be based on the valid conversion tables 306 contained in the configuration data 108. For example, if the conversion of the source reading type code 212 to the destination reading type code 216 involves a conversion of the unit field, the meter data management system 106 can utilize the valid unit conversion table 310 to determine if the pair of enumerations of the unit field before and after the conversion is listed in the valid unit conversion table 310. Similarly, if the conversion involves converting an enumeration of the accumulation field to another enumeration, the meter data management system 106 can utilize the valid accumulation conversion table 308 to determine if the enumerations of the accumulation field before and after the conversion belong to the valid conversion lists. The validity of conversions involving other fields of the reading type code can be determined based on corresponding valid conversion tables 306.

It should be understood that some conversions are inherently valid and thus do not require the meter data management system 106 to query the valid conversion tables 306. For example, converting the multiplier field from one enumeration to another enumeration can always be performed and thus this conversion is inherently a valid conversion. Similarly, converting the measuring period field from one enumeration to another enumeration can also be performed regardless of the specific enumerations involved in the conversion. As such, converting the measuring period field is also inherently a valid conversion.

When determining the validity of the conversion, the meter data management system 106 can also determine the conversion steps 412 for those valid conversions. For example, in order to determine that enumeration 1 to enumeration 3 of a certain field is a valid conversion, the meter data management system 106 might have determined that enumeration 1 to enumeration 2 is a valid conversion according to a valid conversion table and that enumeration 2 to enumeration 3 is a valid conversion according to the valid conversion table. As a result of such a determination, the meter data management system 106 can determine the conversion steps from enumeration 1 to enumeration 3 to include the conversion from enumeration 1 to enumeration 2 and the conversion from enumeration 2 to enumeration 3.

After determining the conversion is a valid conversion and the associated conversion steps 412, the meter data management system 106 can, at block 408 of the process 400, perform the conversion from the source reading type code 212 to the destination reading type code 216 as well as the conversion from the source reading value 210 to a destination reading value 214. The conversion steps 412 can be performed based on the conversion metadata 312 that contain various data needed for the conversion, such as the unit/numerator/denominator 314 as discussed above with respect to FIG. 3D. The meter data management system 106 can utilize the converted reading value 214 along with the destination reading type code 216 to perform analysis as specified in the preferences 124.

Figure 5:
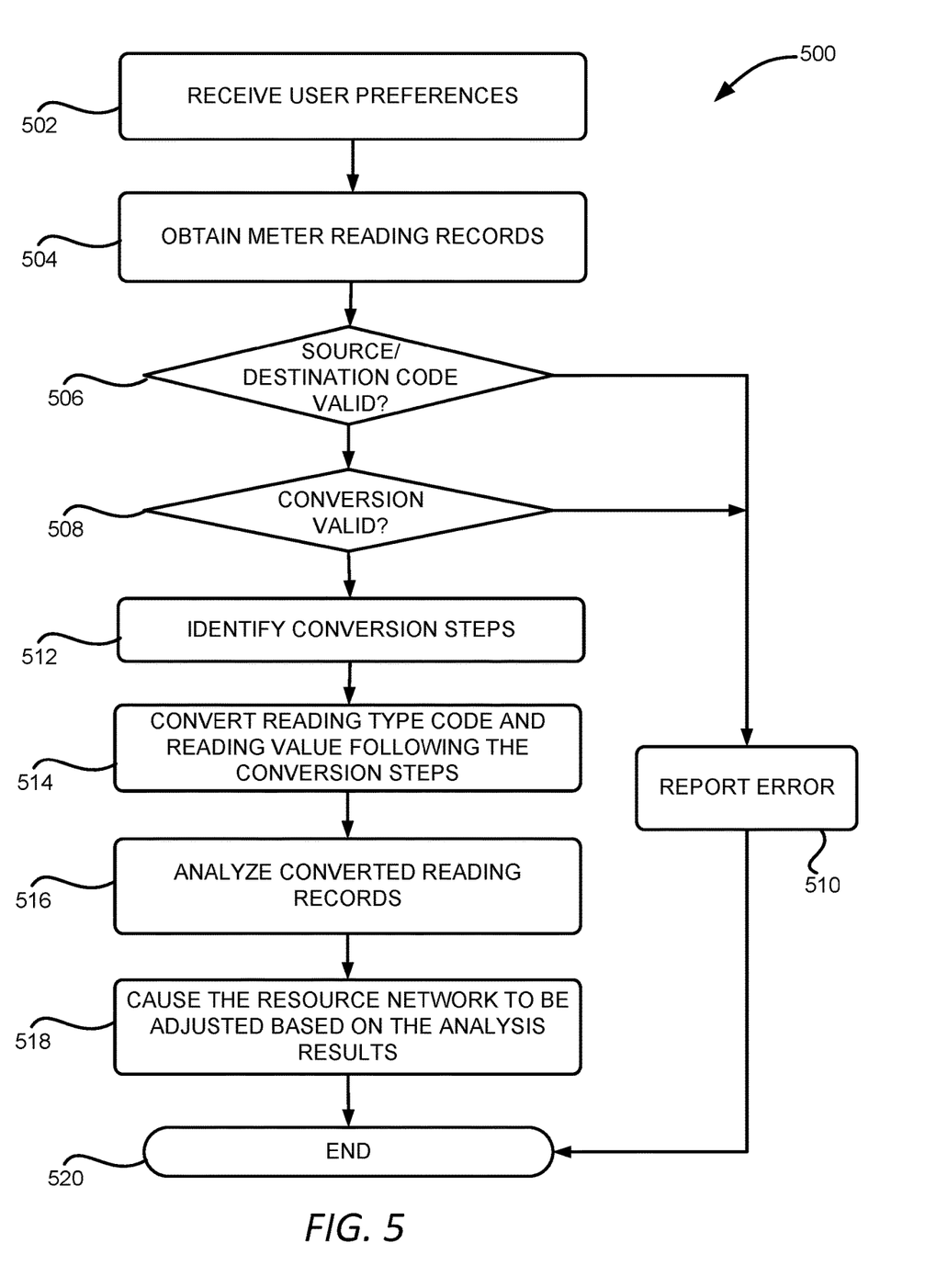
FIG. 5 is an example of a process for managing a resource distribution network based on converting and analyzing meter reading data, according to certain examples of the disclosure.

Turning now to FIG. 5, an example of a process 500 for managing a resource distribution network based on converting and analyzing reading records 122. One or more computing devices (e.g., the meter data management system 106 or the headend system 104) implement operations depicted in FIG. 5 by executing suitable program code. For illustrative purposes, process 500 is described with reference to certain examples depicted in the figures. Other implementations, however, are possible.

At block 502, process 500 involves receiving user preferences 124 specifying the analysis to be performed by the meter data management system 106 and associated parameters. For example, the preferences 124 can include a specific geographic area for which the collected reading records 122 are to be processed and analyzed. The preferences 124 can also include a time period for the reading records 122 to be analyzed, the type of analysis to be performed, the output format of the analysis results, and so on.

At block 504, process 500 involves obtaining meter reading records 122. The reading records 122 can be received from the meter nodes 112 in the resource distribution network associated with the meter data management system 106. For example, the root nodes 114 can forward the reading records 122 received from the meter nodes 112 immediately to the headend system 104 which in turn forward them to the meter data management system 106 for processing without any delay. As a result, the conversion and analysis in this scenario are performed in real time or near real time as the reading records 122 are received at the meter data management system 106.

Alternatively, or additionally, the root nodes 114 or the headend system 104 may store the reading records 122 in a buffer and forward the reading records 122 to the meter data management system 106 in batches. The meter data management system 106 may further store the received reading records 122 in the datastore 126 and process the reading records 122 at a later time when one or more criteria are satisfied, such as when a time period for analysis is reached and all the reading records 122 for that time period have been collected. As discussed above, the reading records 122 may also be uploaded by the user 118 from the client computing system 116. These reading records 122 may include reading records from a resource distribution network different from the resource network associated with the meter data management system 106.

At block 506, process 500 involves determining whether the source reading type code and the destination reading type code are valid. As discussed above in detail with respect to FIG. 4, the meter data management system 106 can determine the validity of the source reading type code and the destination reading type code based on configuration data 108, such as the field relevance table 302 and the valid pair rules 304. If the meter data management system 106 determines, at block 506, that the source reading type code or the destination reading type code is invalid, the meter data management system 106 reports an error message to the client computing system 116 indicating the invalidity of the reading type code so that the user 118 can take proper actions to address the error.

If, at block 506, the meter data management system 106 determines that both the source reading type code and the destination reading type code are valid, the meter data management system 106 further determines, at block 508, whether the conversion from the source reading type code to the destination reading type code is valid or not. The determination can be performed using the valid conversion tables 306 as discussed above regarding FIG. 4. If the conversion is determined to be invalid, the meter data management system 106 can send an error message to the client computing system 116, at block 510. If the conversion is determined to be valid, the meter data management system 106 can identify the conversion steps, at block 512, and perform the conversion following the conversion steps at block 514 as described above with regard to FIG. 4.

At block 516, process 500 involves analyzing the converted reading records 122 to generate analysis results. Because the converted reading records 122 have a common reading type code, the reading value of these reading records 122 can be aggregated or otherwise combined to perform analysis. It should be understood that not all the reading records 122 need to be converted as described above. For example, the reading records 122 that already have the destination reading type code do not need to be converted. In addition, in some implementations, not all the reading records 122 need to be converted to the same destination reading type code. The conversion can be performed so that a set of the reading records 122 that are involved in a certain calculation have a common reading type code whereas another set of the reading records 122 involved in another calculation have a different common reading type code. The results of the two calculations can be combined and further conversion can be performed if necessary.

At block 518, process 500 involves sending the analysis results to the user 118 or other users associated with the resource distribution network so that the resource distribution network can be adjusted based on the analysis results. In one example, the analysis results can include a load profile. Based on the load profile, load balancing can be performed by adjusting the load associated with one or more of the meter nodes 112. For instance, one or more consumer and industrial appliances associated with a meter node measuring a high load during a certain period of time can be switched off by the utility during that period of time to reduce the load, and be switched on afterward.

In another example, the analysis results can include various operational parameters of the resource distribution network, such as a peak demand measure, a peak voltage in the network, an existence of power outages, durations and frequency of power outages, etc. These operational parameters can facilitate the utility to identify abnormalities in, and thus potential problems associated with, the resource distribution network. Proper actions, such as replacing malfunctioning components, adjusting parameters of the system, or reconfiguring the network, can then be taken to address those problems. The analysis results can also be utilized to generate bills to customers of the resource distribution network for their resource consumption.

In yet another example, the reading records 122 can be generated by meter nodes deployed in a resource distribution network involving solar power. At each location where solar panels are installed, two meters can be installed, one for measuring the power consumption and the other for measuring the power generated by the solar panels. The two meters can each generate a reading record for each measurement and send the reading records to the headend system through a root node. The meter data management system can perform analysis on the solar power reading records by converting reading type codes and reading values as described above. Analysis results can help to understand the power consumption and power generation in the network, thereby facilitating the utility to determine incentives for customers to install solar panels and generate solar power.

In some scenarios, multiple meters are deployed in one location of the resource distribution network to measure different loads. For example, in addition to a house, a customer might also have a pool and/or an outbuilding. Multiple meters can be deployed to measure these different loads, such as a meter associated with the house, a meter associated with the pool pump, and a meter associated with the outbuilding. The meter reading record processing and conversion described above can aggregate the readings at these different meters so that the customer can manage the resource consumption. The process 500 ends at block 520.

It should be understood that while the above descriptions with respect to FIGS. 1-5 focus on the $2^{nd}$ Edition of Part 9 of the IEC 61968 standard, the disclosure presented herein is not limited to this specific edition of the standard. Reading type codes following any edition of the standard can be converted and processed in a similar way as described above.

Figure 6:
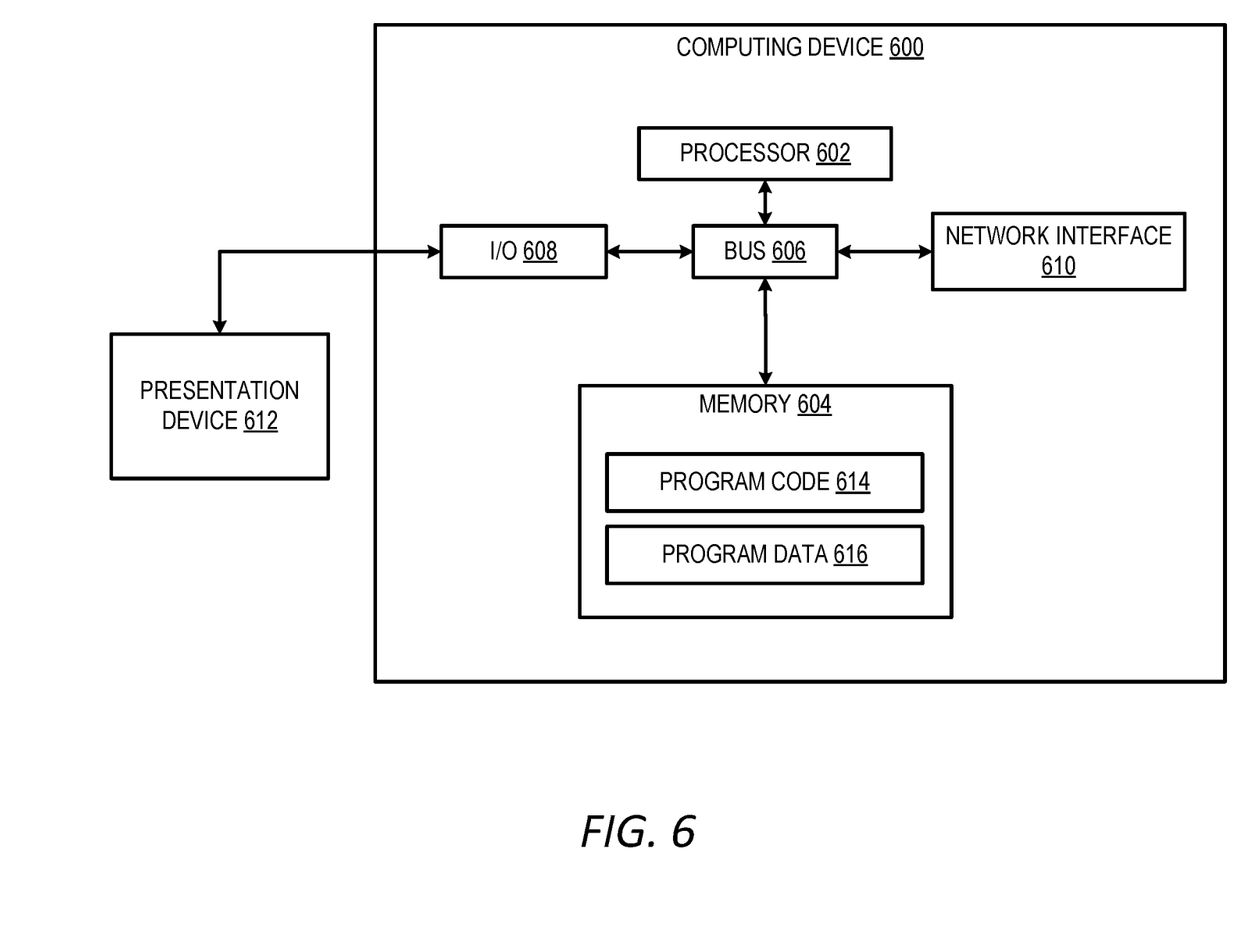
FIG. 6 is a block diagram depicting an example of a computing system suitable for implementing aspects of the techniques and technologies presented herein.

Any suitable computing system or group of computing systems can be used to perform the operations for the converting reading type codes described herein. For example, FIG. 6 is a block diagram depicting an example of a computing device 600, which can be used to implement the meter data management system 106. The computing device 600 can include various devices for communicating with other devices in the operating environment 100, as described with respect to FIG. 1. The computing device 600 can include various devices for performing one or more conversion operations described above with respect to FIGS. 1-5.

The computing device 600 can include a processor 602 that is communicatively coupled to a memory 604. The processor 602 executes computer-executable program code stored in the memory 604, accesses information stored in the memory 604, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 602 include a microprocessor, an application-specific integrated circuit, a field-programmable gate array, or any other suitable processing device. The processor 602 can include any number of processing devices, including one. The processor 602 can include or communicate with a memory 604. The memory 604 stores program code that, when executed by the processor 602, causes the processor to perform the operations described in this disclosure.

The memory 604 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C #, Visual Basic, Java, Python, Perl, JavaScript, ActionScript, etc.

The computing device 600 may also include a number of external or internal devices such as input or output devices. For example, the computing device 600 is shown with an input/output interface 608 that can receive input from input devices or provide output to output devices. A bus 606 can also be included in the computing device 600. The bus 606 can communicatively couple one or more components of the computing device 600.

The computing device 600 can execute program code 614 that includes the meter data management system 106. The program code 614 for the meter data management system 106 may be resident in any suitable computer-readable medium and may be executed on any suitable processing device. For example, as depicted in FIG. 6, the program code 614 for the meter data management system 106 can reside in the memory 604 at the computing device 600 along with the program data 616 associated with the program code 614, such as the configuration data 108. Executing the meter data management system 106 can configure the processor 602 to perform the operations described herein.

In some aspects, the computing device 600 can include one or more output devices. One example of an output device is the network interface device 610 depicted in FIG. 6. A network interface device 610 can include any device or group of devices suitable for establishing a wired or wireless data connection to one or more data networks described herein. Non-limiting examples of the network interface device 610 include an Ethernet network adapter, a modem, etc.

Another example of an output device is the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc. In some aspects, the presentation device 612 can include a remote client-computing device that communicates with the computing device 600 using one or more data networks described herein. In other aspects, the presentation device 612 can be omitted.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software (i.e., computer-readable instructions stored on a memory of the computer system) that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method for managing a resource distribution network, the method comprising:

receiving, by a meter data management system, an input identifying a geographical area of the resource distribution network;

obtaining, by the meter data management system, a plurality of meter reading records, wherein the plurality of meter reading records are collected from a plurality of meter nodes deployed in the geographical area of the resource distribution network, each of the plurality of meter nodes configured to measure at least one characteristic of resource consumption at a location associated with the meter node, and each of the meter reading records comprising a first reading value of the at least one characteristic of resource consumption and a first International Electrotechnical Commission (IEC) reading type code identifying a type of the first reading value, wherein the first IEC reading type code is generated according to the IEC 61968 standard and comprises a plurality of fields, each field associated with a list of enumerations of possible values;

processing, by the meter data management system, the plurality of meter reading records by converting at least one of the meter reading records from the first IEC reading type code to a common IEC reading type code so that reading values of the plurality of meter reading records can be aggregated, wherein the common IEC reading type code follows the IEC 61968 standard, and wherein converting the at least one of the meter reading records comprises:

determining that the first IEC reading type code is valid by identifying a first pair of relevant fields of the first IEC reading type code and determining enumerations for the first pair of relevant fields is a valid pair of enumerations;

determining that the common IEC reading type code is valid by identifying a second pair of relevant fields of the common IEC reading type code and determining enumerations for the second pair of relevant fields is a valid pair of enumerations; and determining that a conversion from the first IEC reading type code to the common IEC reading type code is valid by determining that a conversion of a first enumeration for a field of the first IEC reading type code to a second enumeration for a corresponding field of the common IEC reading type code is a valid conversion;

aggregating, by the meter data management system, the plurality of meter reading records including the converted at least one meter reading record to generate a load profile; and causing a load associated with one of the plurality of meter nodes to be adjusted based on the load profile.

2. The method of claim 1, wherein the type of the first reading value comprises one or more of a unit of the first reading value, a measuring period associated with the first reading value, an accumulation mode associated with the first reading value or a scale indicator of the first reading value.

3. The method of claim 1, wherein determining that the conversion from the first IEC reading type code to the common IEC reading type code is valid further comprises determining conversion steps from the first IEC reading type code to the common IEC reading type code, and wherein converting the first IEC reading type code to the common IEC reading type code is performed by following the conversion steps.

4. The method of claim 1, wherein converting the at least one of the meter reading records further comprises converting the first IEC reading type code to the common IEC reading type code based on configuration data and wherein the configuration data comprise one or more of a field relevance table indicating relevance between at least a pair of fields of an IEC reading type code, valid pair rules comprising valid pairs of enumerations of two relevant fields of the IEC reading type code, or a valid conversion table comprising valid conversions from one enumeration to another enumeration of a field of the IEC reading type code.

5. The method of claim 1, wherein converting the at least one of the meter reading records further comprises:
in response to determining that the first IEC reading type code or the common IEC reading type code is invalid, or that the conversion from the first IEC reading type code to the common IEC reading type code is invalid, generating an error message.

6. The method of claim 1, wherein the plurality of meter reading records are collected from the plurality of meter nodes through at least one of a mesh network, a cellular network or a power line communication network.

7. A system for managing a resource distribution network, the system comprising:
a plurality of meter nodes deployed in the resource distribution network; and
a computing device configured for:
obtaining a plurality of meter reading records, the plurality of meter reading records collected from the plurality of meter nodes, each of the plurality of meter reading records comprising a first reading value and a first International Electrotechnical Commission (IEC) reading type code identifying a type associated with the first reading value, wherein the first IEC reading type code is generated according to the IEC 61968 standard and comprises a plurality of fields, each field associated with a list of enumerations of possible values,
processing the plurality of meter reading records by converting at least one of the meter reading records from the first IEC reading type code to a common IEC reading type code so that reading values of the plurality of meter reading records can be aggregated, wherein the common IEC reading type code follows the IEC 61968 standard, and wherein converting the at least one of the meter reading records comprises:
determining that the first IEC reading type code of the at least one of the meter reading records is valid by identifying a first pair of relevant fields of the first IEC reading type code and determining enumerations for the first pair of relevant fields is a valid pair of enumerations,
determining that the common IEC reading type code is valid by identifying a second pair of relevant fields of the common IEC reading type code and determining enumerations for the second pair of relevant fields is a valid pair of enumerations, and
determining that a conversion from the first IEC reading type code to the common IEC reading type code is valid by determining that a conversion of a first enumeration for a field of the first IEC reading type code to a second enumeration for a corresponding field of the common IEC reading type code is a valid conversion,
aggregating the plurality of meter reading records including the converted meter reading record to generate operational parameters of the resource distribution network, and
causing the resource distribution network to be adjusted based on the operational parameters.

8. The system of claim 7, wherein the type of the first reading value comprises one or more of a unit of the first reading value, a measuring period associated with the first reading value, an accumulation mode associated with the first reading value or a scale indicator of the first reading value.

9. The system of claim 7, wherein determining that the conversion from the first IEC reading type code to the common IEC reading type code is valid further comprises determining conversion steps from the first IEC reading type code to the common IEC reading type code, and wherein converting the first IEC reading type code to the common IEC reading type code is performed by following the conversion steps.

10. The system of claim 7, wherein converting the at least one of the meter reading records further comprises converting the first IEC reading type code to the common IEC reading type code based on configuration data and wherein the configuration data comprise one or more of a field relevance table indicating relevance between at least a pair of fields of an IEC reading type code, valid pair rules comprising valid pairs of enumerations of two relevant fields of the IEC reading type code, or a valid conversion table comprising valid conversions from one enumeration to another enumeration of a field of the IEC reading type code.

11. The system of claim 7, wherein converting the at least one of the meter reading records further comprises:
in response to determining that the first IEC reading type code or the common IEC reading type code is invalid, or that the conversion from the first IEC reading type code to the common IEC reading type code is invalid, generating an error message.

12. The system of claim 7, wherein each of the plurality of meter nodes is configured to measure at least one characteristic of resource consumption at a location associated with the meter node, wherein the generated operational parameters of the resource distribution network comprise a load profile of the resource distribution network, and wherein adjusting the resource distribution network comprises adjusting a load associated with one of the plurality of meter nodes based on the load profile.

13. The system of claim 7, further comprising a communication network connecting the plurality of meter nodes and the computing device, wherein the communication network comprising a mesh network, a cellular network or a power line communication network.

14. A non-transitory computer-readable medium having program code that is stored thereon, the program code executable by one or more processing devices for performing operations comprising:
  obtaining a plurality of meter reading records, the plurality of meter reading records are collected from one or more meter nodes deployed in a resource distribution network, each of the plurality of meter reading records comprising a first reading value and a first International Electrotechnical Commission (IEC) reading type code identifying a type associated with the first reading value, wherein the first IEC reading type code is generated according to the IEC 61968 standard and comprises a plurality of fields, each field associated with a list of enumerations of possible values;
  processing the plurality of meter reading records by converting at least one of the meter reading records from the first IEC reading type code to a common IEC reading type code so that reading values of the plurality of meter reading records can be aggregated, wherein the common IEC reading type code follows the IEC 61968 standard, and wherein converting the at least one of the meter reading records comprises:
    determining that the first IEC reading type code of the at least one of the meter reading records is valid by identifying a first pair of relevant fields of the first IEC reading type code and determining enumerations for the first pair of relevant fields is a valid pair of enumerations;
    determining that the common IEC reading type code is valid by identifying a second pair of relevant fields of the common IEC reading type code and determining enumerations for the second pair of relevant fields is a valid pair of enumerations; and
    determining that a conversion from the first IEC reading type code to the common IEC reading type code is valid by determining that a conversion of a first enumeration for a field of the first IEC reading type code to a second enumeration for a corresponding field of the common IEC reading type code is a valid conversion;
  aggregating the plurality of meter reading records including the converted meter reading record to generate operational parameters of the resource distribution network; and
  causing the resource distribution network to be adjusted based on the operational parameters.

15. The non-transitory computer-readable medium of claim 14, wherein the type of the first reading value comprise one or more of a unit of the first reading value, a measuring period associated with the first reading value, an accumulation mode associated with the first reading value or a scale indicator of the first reading value.

16. The non-transitory computer-readable medium of claim 14, wherein determining that the conversion from the first IEC reading type code to the common IEC reading type code is valid further comprises determining conversion steps from the first IEC reading type code to the common IEC reading type code, and wherein converting the first IEC reading type code to the common IEC reading type code is performed by following the conversion steps.

17. The non-transitory computer-readable medium of claim 14, wherein converting the at least one of the meter reading records further comprises converting the first IEC reading type code to the common IEC reading type code based on configuration data and wherein the configuration data comprise one or more of a field relevance table indicating relevance between at least a pair of fields of an IEC reading type code, valid pair rules comprising valid pairs of enumerations of two relevant fields of the IEC reading type code, or a valid conversion table comprising valid conversions from one enumeration to another enumeration of a field of the IEC reading type code.

* * * * *